United States Patent
Bohman et al.

(10) Patent No.: US 6,237,951 B1
(45) Date of Patent: May 29, 2001

(54) DEVICE FOR LETTING PRESSURIZED GAS STREAM INTO A SAFETY DEVICE

(75) Inventors: Mats Bohman, Lerum; Peter Qvint, Vårgårda, both of (SE)

(73) Assignee: Autoflator AB, Vårgåda (SE)

( * ) Notice: Subject to any disclaimer, the term of this patent is extended or adjusted under 35 U.S.C. 154(b) by 0 days.

(21) Appl. No.: 09/485,569

(22) PCT Filed: Aug. 13, 1998

(86) PCT No.: PCT/EP98/05153

§ 371 Date: May 11, 2000

§ 102(e) Date: May 11, 2000

(87) PCT Pub. No.: WO98/08906

PCT Pub. Date: Feb. 25, 1999

(30) Foreign Application Priority Data

Aug. 13, 1997 (DE) .......................................... 297 14 518 U

(51) Int. Cl.[7] .................................................... B60R 21/26
(52) U.S. Cl. ............................................ 280/737; 280/741
(58) Field of Search ..................................... 280/737, 741

(56) References Cited

U.S. PATENT DOCUMENTS

| | | | |
|---|---|---|---|
| 4,203,616 | * 5/1980 | Okada | 280/737 |
| 4,275,901 | * 6/1981 | Okada | 280/737 |
| 4,289,327 | 9/1981 | Okada | 280/737 |
| 5,611,567 | 3/1997 | Hoo | 280/737 |
| 5,678,856 | * 10/1997 | Headley | 280/737 |
| 5,803,494 | * 9/1998 | Headley | 280/741 |
| 5,826,904 | * 10/1998 | Ellis et al. | 280/737 |

FOREIGN PATENT DOCUMENTS

| | | |
|---|---|---|
| 2224617 | 3/1973 | (DE) . |
| 19540618 | 5/1997 | (DE) . |
| 19540619 | 5/1997 | (DE) . |
| 96/41732 | 12/1996 | (WO) . |

* cited by examiner

Primary Examiner—Kenneth R. Rice
(74) Attorney, Agent, or Firm—Dilworth & Barrese LLP.

(57) ABSTRACT

The invention refers to a device permitting the flow of pressurized gas into a safety device, for example an air bag or a belt tightener, with a pressurized container for compressible gas with at least one opening, that is sealed with a gas-tight film covering, where the film covering is supported evenly, over at least a large part of its free surface, by a support device that can be destroyed or retracted in a targeted manner after triggering. To ensure that the gas-tight film covering is forcibly opened after the triggering of the device, a piece is provided that pierces or penetrates the film immediately after the triggering of the device, but before the support device moves.

20 Claims, 4 Drawing Sheets

DEVICE FOR LETTING PRESSURIZED GAS STREAM INTO A SAFETY DEVICE

BACKGROUND OF THE INVENTION

The invention refers to a device permitting the flow of pressurized gas into a safety device, for example an air bag or a belt tightener according to the pressurized container for compressible gas with at least one opening that is sealed with a gas-tight film covering, wherein the film covering is supported evenly, over at least a large part of its surface, by a support device that can be destroyed or retracted in a targeted manner after triggering Such devices according to the state of the art have a pressurized container for compressible gas with at least one opening, that is sealed with a gas-tight film covering, where the film covering is supported evenly, over at least a large part of its free surface, by a support device that can be destroyed or retracted in a targeted manner after triggering. Such a mechanism is already known from DE 195 40 618 A, in which the gas-tight film seal is opened as soon as the support device was removed after triggering of the device.

To ensure that the gas-tight film covering opens systematically after removal of the support device, for example, the piercing of the film forcibly in one location by means of a sharp edge provided on the support device, mounted so as to slide, is described in WO 96 41 732.

When using a destructible or retractable or collapsible support device, it is difficult to provide for the piercing of the sealing foil in connection with the movement of the support device in a reproducible fashion.

SUMMARY OF THE INVENTION

The object of the invention is therefore to develop the generic device cited at the beginning in such manner that after triggering the device permitting pressurized gas to flow, it is ensured that the gas-tight film closing the pressurized container is forcibly opened.

According to the invention, this task is solved starting from a device according to the device letting pressurized gas stream into a safety device, for example an airbag or a belt tightener, with a pressurized container for compressible gas with at least one opening that is sealed with a gas-tight film covering, wherein the film covering is supported evenly, over at least a large part of its surface, by a support device that can be destroyed or retracted in a targeted manner after triggering by means of a piece that pierces or penetrates the film immediately after the triggering of the device but before the time at which the support device moves. According to this, the device has a piece that pierces the film immediately after the triggering of the device but before the support device has moved. This also ensures that the gas-tight film is forcibly opened in the event that a support device that collapses after triggering is used.

The subclaims dependent on the particularly suitable embodiments of the invention are presented herein.

Advantageously, the device has a pyrotechnic propellant that is ignited after triggering. Here it is particularly advantageous if the pyrotechnic propellant causes the piercing of the gas-tight film after ignition and then moves away from the support device.

The support device advantageously has an opening underneath the supported gas-tight film, the opening being about 20% of the surface area of the whole gas-tight film.

A nail can be driven through this opening by means of the expanding combustion gas from the pyrotechnic propellant, in order to forcibly pierce the film. Here, the nail can advantageously be mounted on the support device such that it pivots.

As an alternative, however, the film can be burned by the expanding combustion gas from the pyrotechnic propellant that penetrates through the opening in the support device directly to the gas-tight film.

According to one advantageous embodiment of the invention, the support device is created such that it collapses after ignition of the pyrotechnic propellant.

Further details and advantages of the invention are explained in greater detail based on the methods of embodiment. They show:

DESCRIPTION OF THE PREFERRED EMBODIMENTS

Figure 1:
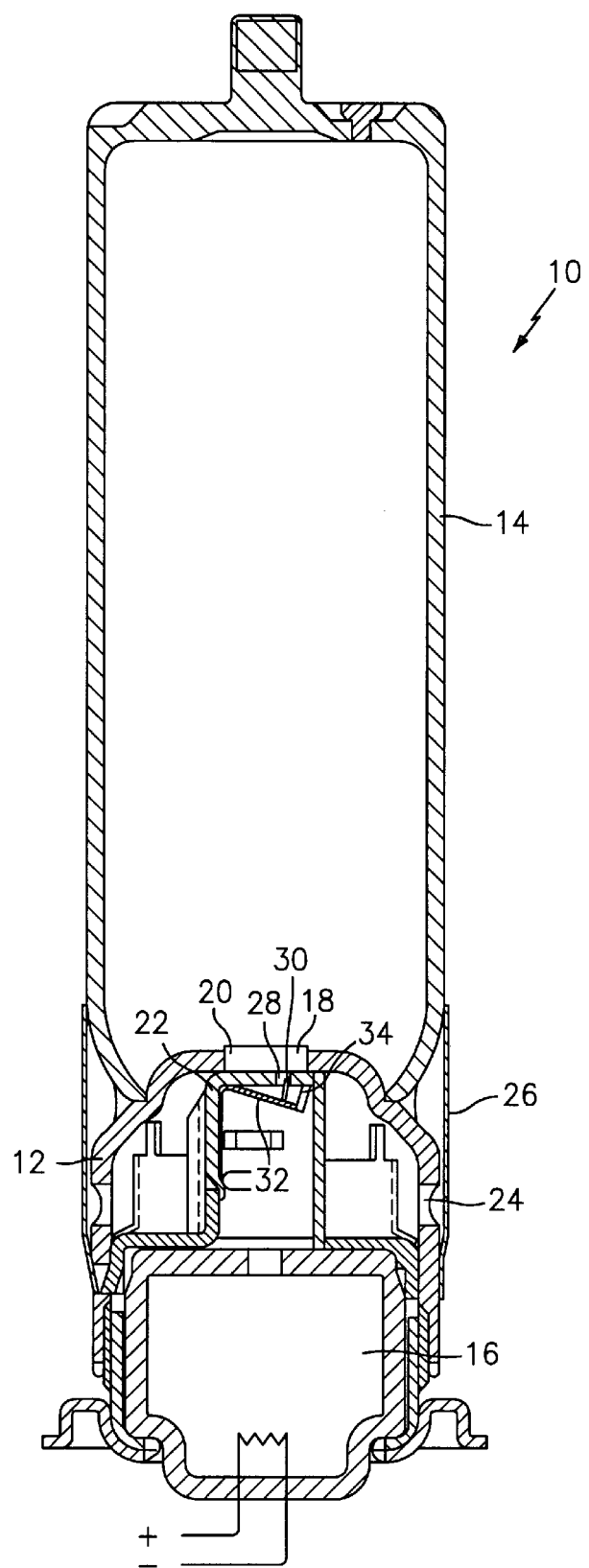
FIG. 1: A longitudinal section through a device according to the invention in an initial method of embodiment.
Figure 2:
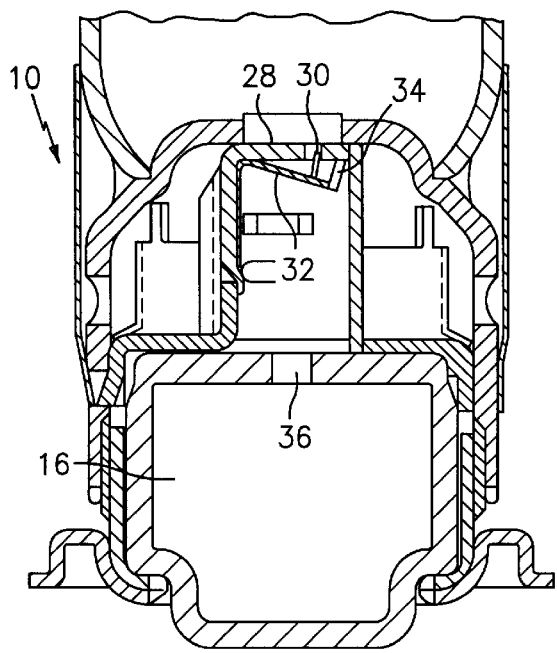
FIGS. 2 through 5: Details of the view according to FIG. 1 at different times in the ignition of the device according to the first method of embodiment.

In the method of embodiment according to FIG. 1, a device permitting pressurized gas to flow into an airbag (not shown here in greater detail) is shown. A pressurized container 14 is welded to the housing 12, to accept a compressible gas. The compressible gas, for example, is pressurized to 200 bars. In the lower part of the housing 12, a pyrotechnic propellant 16 is placed that can be ignited in known manner after triggering by a corresponding sensor. The pressurized container 14 has an opening 18 into the housing 12. This is sealed with a gas-tight film, for example in the manner known from DE 195 40 618 A1. So that the gas-tight film is not destroyed by the high pressure of the compressed gas in the gas container 14, it is supported by a destructible or retractable support device 22. The outlet openings 24 and the nettings 26, located in front of them, are provided in the housing 12 in a manner known from the state of the art. The compressed gas can flow through outlet openings 24 to inflate the airbag.

In this method of embodiment according to the invention, an opening 28 is provided in the destructible or retractable support device 22, which otherwise corresponds to the one in DE 195 40 618 A1. This opening 28 lies below the gas-tight film 20 supported and evenly covered by support device 22. To prevent undesired destruction of the film, the surface of the unsupported area of the film 20, created by opening 28, is significantly smaller than the entire surface of the gas-tight film 20.

Below opening 28 and the film 20 lying thereon, a nail 30 is mounted on the support 22 in a pivotable fashion. It is mounted, for example, on a small plate 32 that is connected at one edge with the support device 22, for instance, by means of a film hinge so that it can pivot. To prevent undesired piercing, caused by vibrations, of the nail 30 though the opening 28 into the gas-tight film 20 located over the opening 28, a breakaway limiting edge 34 is also mounted on the plate 32 that bears the nail 30; it is mounted on the plate 32 in the inclined position shown in FIG. 1.

Figure 3:
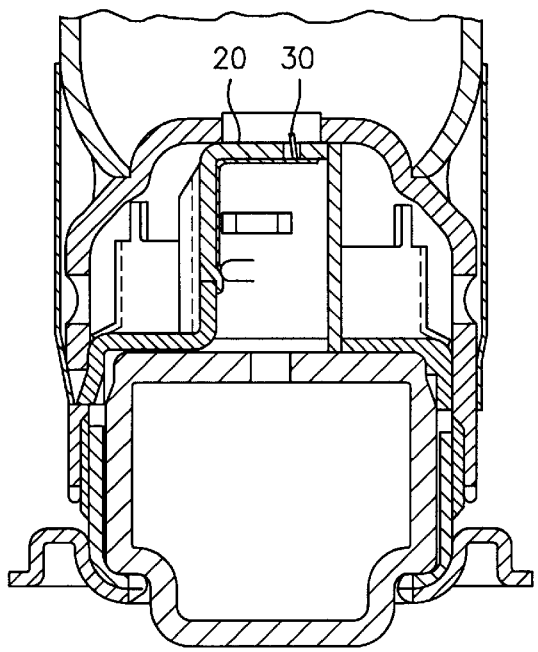
Figure 4:
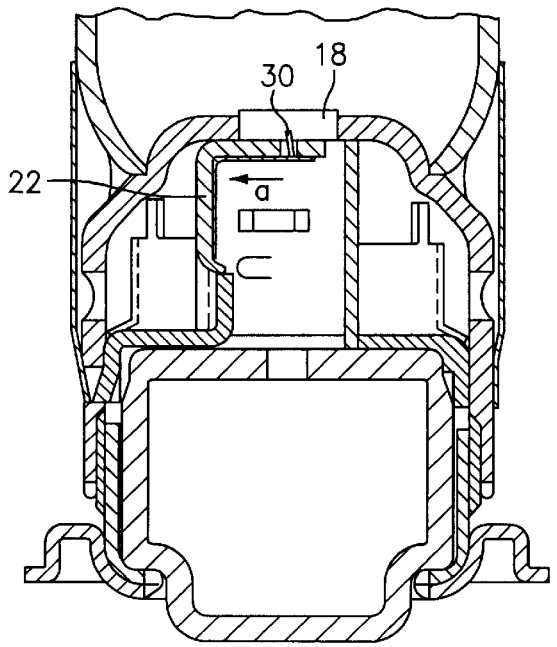
Figure 5:
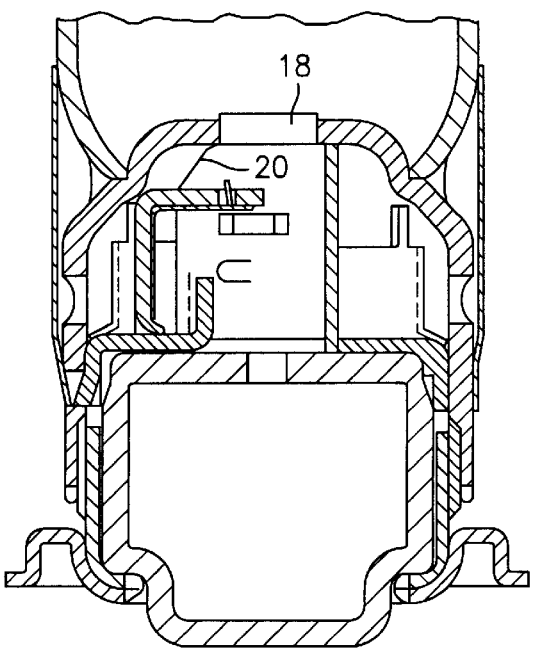

The method of action of the device according to the invention can be explained based on FIGS. 2 through 5. The device is shown in the state at the time of triggering in FIG. 2. The nail 30 is still in its initial position. However, the pyrotechnic propellant 16 is ignited so that the spontaneous development of the combustion gas from the propellant flows out through the corresponding opening 36 in the direction toward the plate 32. The breakaway limiting edge 34 is broken away by the developing pressure, so that due to the developing gas pressure, the plate 32 is pivoted around its swivel edge and the nail 30 penetrates opening 28 and the gas-tight film 20 so that the gas-tight film 20 is pierced with certainty. This state is shown in FIG. 3. Based on the pressure which continues to develop due to the ignition of the pyrotechnic propellant 16, the support device 22 is thrust laterally, as shown by the arrow a in FIG. 4. Finally, the support device collapses laterally and frees opening 18 completely, so that the forcibly-pierced gas-tight film 20 is moved away completely from opening 28 by the streaming gas, due to the lack of support. This final state is shown in FIG. 5.

Figure 6:
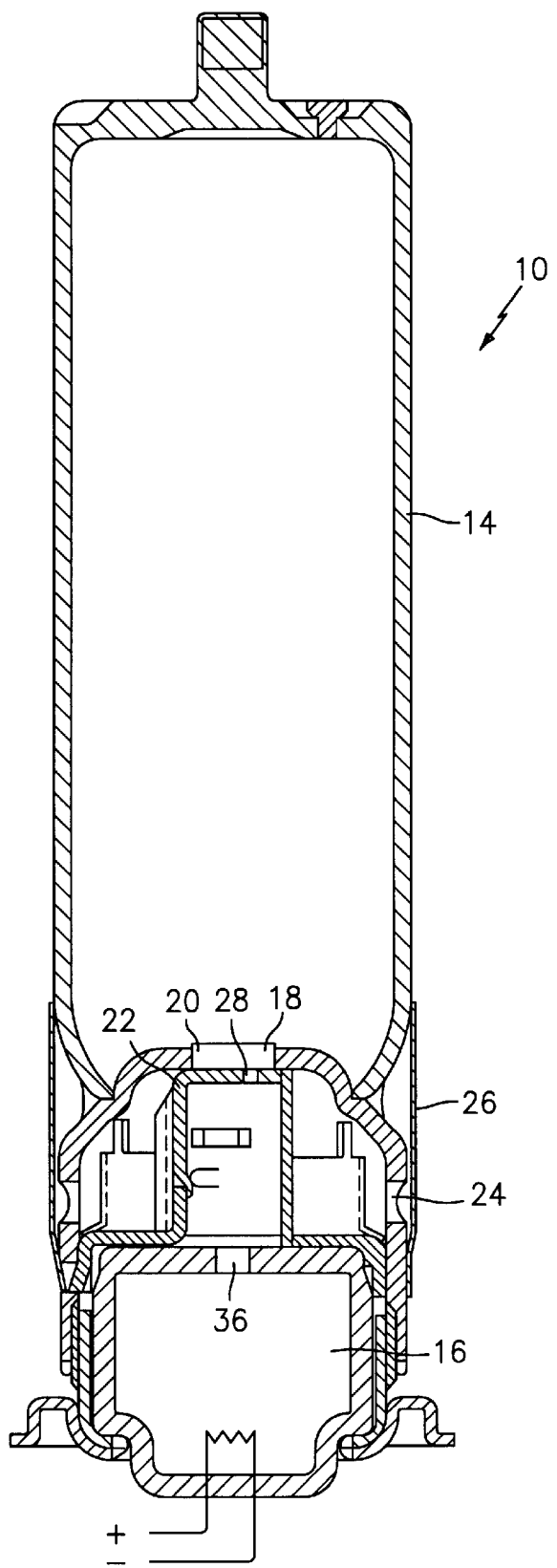
FIG. 6: A second method of embodiment of the invention in a view according to FIG. 1, and FIGS. 7 through 9: Detail views of the method of embodiment in FIG. 6 at different times during ignition of the device.
Figures 7, 8:
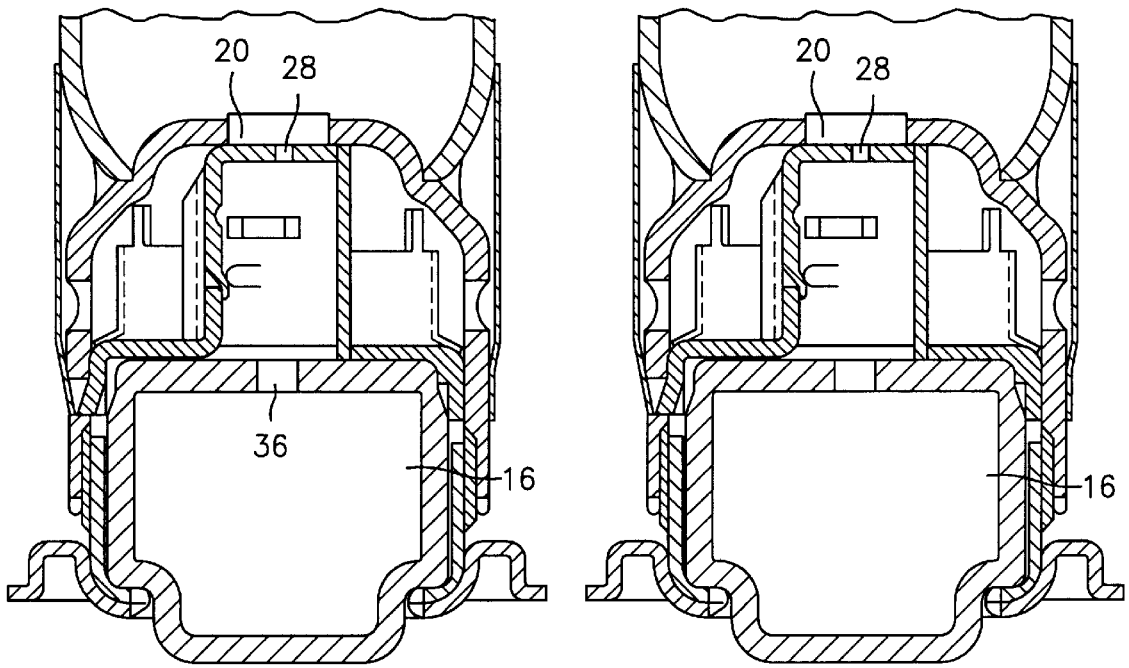
Figure 9:
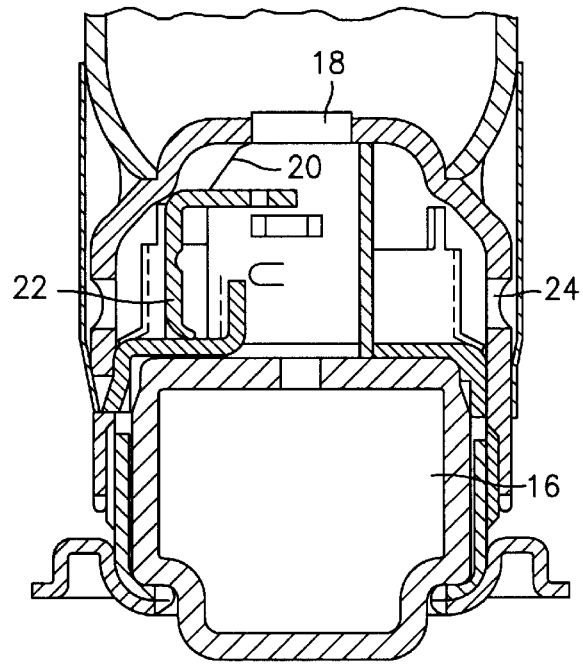

The method of embodiment according to FIG. 6 corresponds essentially to that shown in FIG. 1, so that the same parts are marked with the same reference numbers. In contrast to the method of embodiment in FIG. 1, there is no pivotable nail beneath the opening 28 in the support device 22. Here, only the opening 28 is left free beneath the gas-tight film 20. The method of action of this device is shown in FIGS. 7 through 9. FIG. 7 corresponds to the lateral view of the first method of embodiment of the invention according to FIG. 2. Here, the propellant 16 has just been ignited and the combustion gases are exiting through the opening 36. At this time, the film 20 is not sealed gas-tight. In the view in FIG. 8, the gas from the pyrotechnic propellant is expanding shortly after the time shown in FIG. 7, and is flowing through the opening 28 to the surface of the gas-tight film 20. The gas from the pyrotechnic propellant has burned the film at the contact point, so that it is pierced by the combustion in the area of the opening 28.

In the view according to FIG. 9, the support device 22 has been thrust to the side, shortly thereafter, by the rising pressure after ignition of the pyrotechnic propellant, so that it collapsed due to the lack of support. This released opening 18 and the forcibly-opened gas-tight film 20 is completely blown out by gas through the opening. The pressurized gas can thus flow freely through opening 24 into the airbag, not shown here in greater detail.

What is claimed is:

1. Device letting pressurized gas stream into a safety device, for example an air bag or a belt tightener, with a pressurized container for compressible gas with at least one opening, that is sealed with a gas-tight film covering, wherein the film covering is supported evenly, over at least a large part of its free surface, by a support device that can be destroyed or retracted in a targeted manner after triggering, comprising
   a piece that pierces or penetrates the film immediately after the triggering of the device but before the time at which the support device moves.

2. Device according to claim 1 wherein it can be activated by a pyrotechnic propellant.

3. Device according to claim 2 wherein the pyrotechnic propellant first causes the penetration of the film and then moves the support device out of its position.

4. Device according to claim 2 wherein the support device has an opening beneath the film surface, the area of which is less than 20% of the whole film surface area.

5. Device according to claim 4 wherein a nail is thrust through the opening in the support device by the combustion gas from the pyrotechnic propellant in such manner that it pierces the film.

6. Device according to claim 5 wherein the nail is mounted on the support device in a pivotable manner.

7. Device pursuant to claim 2 wherein the combustion gas from the pyrotechnic propellant penetrates the film such that it burns a hole in the area of the opening in the support device.

8. Device pursuant to claim 2 wherein the support device is designed such that it collapses after ignition of the pyrotechnic device.

9. Device according to claim 3, wherein the support device has an opening beneath the film surface, the area of which is less than 20% of the whole film surface area.

10. Device pursuant to claim 3, wherein the combustion gas from the pyrotechnic propellant penetrates the film such that it burns a hole in the area of the opening in the support device.

11. Device pursuant to claim 4, wherein the combustion gas from the pyrotechnic propellant penetrates the film such that it burns a hole in the area of the opening in the support device.

12. Device pursuant to claim 3, wherein the support device is designed such that it collapses after ignition of the pyrotechnic device.

13. Device pursuant to claim 4, wherein the support device is designed such that it collapses after ignition of the pyrotechnic device.

14. Device pursuant to claim 5, wherein the support device is designed such that it collapses after ignition of the pyrotechnic device.

15. Device pursuant to claim 6, wherein the support device is designed such that it collapses after ignition of the pyrotechnic device.

16. Device pursuant to claim 7, wherein the support device is designed such that it collapses after ignition of the pyrotechnic device.

17. Device pursuant to claim 9, wherein a nail is thrust through the opening in the support device by the combustion gas from the pyrotechnic propellant in such manner that it pierces the film.

18. Device according to claim 17, wherein the nail is mounted on the support device in a pivotable manner.

19. Device pursuant to claim 9, wherein the combustion gas from the pyrotechnic propellant penetrates the film such that it burns a hole in the area of the opening in the support device.

20. Device pursuant to claim 9, wherein the support device is designed such that it collapses after ignition of the pyrotechnic device.

* * * * *